(No Model.)
A. J. O'REILLY.
SYSTEM OF LAYING TELEGRAPH WIRES.
No. 284,655. Patented Sept. 11, 1883.
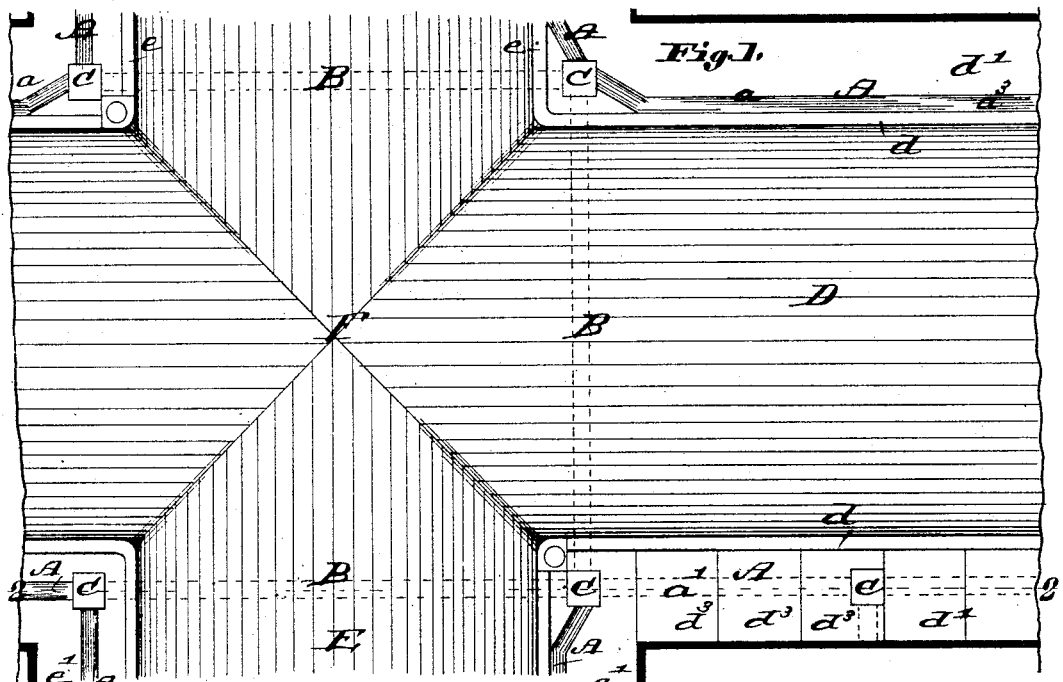
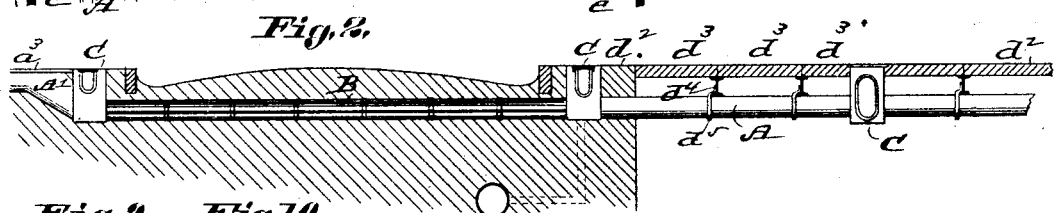
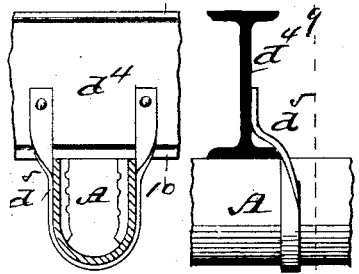 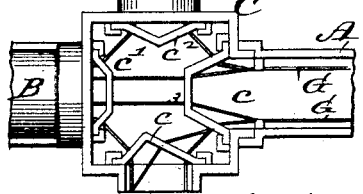 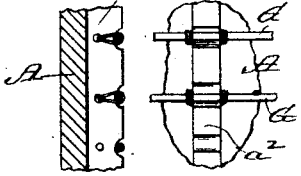
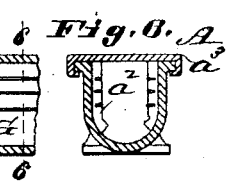
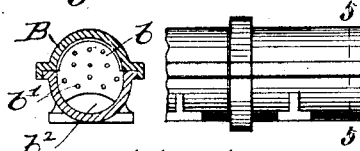 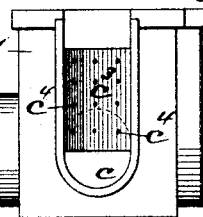
Attest:
Charles Pickles
Albert G. Fish
Inventor:
Andrew J. O'Reilly
by C. D. Moody
atty.

UNITED STATES PATENT OFFICE.

ANDREW J. O'REILLY, OF ST. LOUIS, MISSOURI.

SYSTEM OF LAYING TELEGRAPH-WIRES.

SPECIFICATION forming part of Letters Patent No. 284,655, dated September 11, 1883.

Application filed April 17, 1883. (No model.)

*To all whom it may concern:*

Be it known that I, ANDREW J. O'REILLY, of St. Louis, Missouri, have made a new and useful Improvement in Systems of Laying Telegraph-Wires, of which the following is a full, clear, and exact description, reference being had to the annexed drawings, making part of this specification, in which—

Figure 1 is a plan of a street-crossing; Fig. 2, a vertical section on the line 2 2 of Fig. 1; Fig. 3, a plan of one of the corner-boxes, the cover being removed; Fig. 4, a side elevation, partly in section, of the parts shown in Fig. 3; Fig. 5, a vertical section on the line 5 5 of Fig. 4; Fig. 6, a vertical section on the line 6 6 of Fig. 4; Figs. 7, 8, details upon an enlarged scale, showing the mode of attaching the wires in the tubes, the views being respectively a section and a side elevation (from the inner side) of a portion of the tube; Fig. 9, a cross-section on the line 9 9 of Fig. 10, and Fig. 10 a section on the line 10 10 of Fig. 9.

The same letters of reference denote the same parts.

In this system the wires are carried in troughs and pipes, which are laid along the streets within the line of the curbstone of the sidewalks, and at or beneath the surface of the sidewalks, and at the street-crossings, passing sufficiently beneath the street-surface to avoid the pavement, and, on the other hand, not deep enough to encounter water and gas pipes. Wherever practicable the tops of the troughs can be flush with and form part of the sidewalk-surface. At the street-crossings and elsewhere, as desired, what are termed "corner-boxes" are introduced to enable the wires to be turned and carried in any desired direction. The troughs, pipes, and corner-boxes are made of a non-electrical conductor material, preferably clay fused at the surface, and the insulators to which the wires are immediately attached are preferably made in one piece with the troughs, pipes, or corner-boxes.

A, Figs. 1, 2, 3, 4, represents that part of the apparatus termed the "trough." B represents the pipe, and C the corner-box. In Figs. 1 and 2 the mode of laying these parts is shown. D and E represent two streets crossing at F. The curbstones of the streets are represented at $d$ and $e$, respectively. The troughs A A may be laid close to the curbstones, or they may be set back from the curbstones; but in all cases they should be somewhere in the line of the sidewalks $d'$ $e'$, respectively, of the streets D E. At $a$, Figs. 1, 2, the tops of the troughs come to the surface $d^2$ of the sidewalks, and at $a'$ the troughs are shown somewhat below the sidewalk-surface. This may be the case when flag-stones $d^3$, resting upon beams $d^4$, are used, and in such case the troughs may, by means of suitable straps, $d^5$, be suspended from the beams $d^4$.

In crossing the streets the pipes B B are used. The pipes B B and the troughs A A differ in this. After the pipes are laid it is not expected to open them from the top, as that would be impracticable, but to introduce the wires therein at the ends of the pipes—that is, at or near the curbstones. To separate the wires in the pipes the latter are provided at or near the curbstones with diaphragms, partitions, or cross-pieces $b$ $b$, having perforations $b'$ $b'$. The wires G G are readily passed endwise through the opening $b^2$ beneath the partitions, and thence to the other end of the pipe at the opposite side of the street, after which they are drawn through the perforations $b'$ $b'$, respectively appropriated to them. The troughs A A, on the other hand, are, as a general rule, expected to be opened from the top, as occasion may require. The troughs are provided with insulator projections or ribs $a^2$ $a^2$, which are suitably notched or otherwise shaped to receive the wires G G, which are then lashed to the ribs, substantially as shown in Figs. 7, 8—that is, whenever and wherever it is necessary to introduce a wire into the trough, the cover $a^3$ is removed and the wires introduced and secured in the trough, as described. The wires may be held and insulated in the troughs in other ways, but the means therefor shown I consider the preferable; and, as above stated, I preferably make the troughs, as well as the pipes and corner-boxes, of clay, the surface of which is glazed similarly to that of an ordinary glazed sewer-pipe. The corner-boxes are used to connect the pipes and troughs. These boxes are used when it is necessary to carry the wires in various directions at angles with each other—for instance, at a street-crossing, or where it is desired to assemble the wires from various quarters, or to branch them in various directions. To this end the boxes C C have outlets $c\ c\ c\ c$ at two or more sides, and are provided with perforated partitions $c'\ c^2\ c^3$, which are extended or projected in the boxes at various inclinations and angles therein to suit the requirements of the situation. The wires pass through the outlets $c$ and through the perforations $c^4$ in the partitions $c'$, &c.

The troughs A', used to form the immediate connection with the corner-boxes, may be and frequently are inclined, to bring the wires down to the proper level before passing them into the pipes.

The space $b^2$ in the pipes B serves to drain the pipes as well as for the passage of the wires.

I claim—

1. The combination of the troughs A, laid in the sidewalk, and having insulations $a^2$ and covers $a^3$, with the street-crossing pipe B, having perforated cross-pieces $b$, so constructed as to leave a water-drain opening, $b^2$, substantially as described.

2. The combination of troughs A, having provision for the telegraph-wires, and laid as set forth, with the corner-boxes C and street-crossing pipes B, the several parts constructed as described.

3. The inclined pipes A', combined with the corner-boxes C and the troughs A and street-crossing pipes B, whereby the telegraph-wires are laid in place and insulated, all as described and set forth.

ANDREW J. O'REILLY.

Witnesses:
C. D. MOODY,
ALBERT G. FISH.